Figure 3:
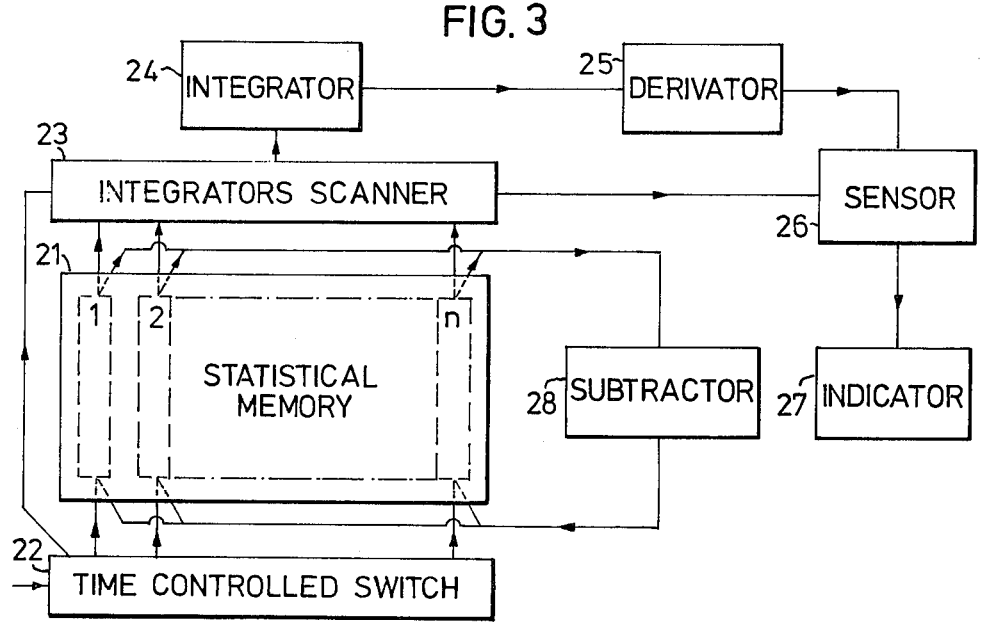

United States Patent [19]

Edlund

[11] 3,928,754
[45] Dec. 23, 1975

[54] DEVICE FOR CALCULATING THE RESONANT ROLLING PERIOD OF A SHIP

[76] Inventor: Herman Allan Friedrich Edlund, Kolstorp, S-610 24 Vikbolandet, Sweden

[22] Filed: May 3, 1974

[21] Appl. No.: 466,855

[30] Foreign Application Priority Data
May 7, 1973 Sweden.............................. 7306342

[52] U.S. Cl. ............... 235/150.2; 114/125; 235/183
[51] Int. Cl.² .................... B63B 43/06; G06F 15/50
[58] Field of Search............ 235/183, 150.2, 150.26, 235/150.27, 150.1; 114/121, 122, 125, 126; 318/588; 340/29

[56] References Cited
UNITED STATES PATENTS

| | | | |
|---|---|---|---|
| 2,910,233 | 10/1959 | Brackmann et al.............. | 235/150.2 |
| 3,516,377 | 6/1970 | Field et al........................... | 114/125 |
| 3,559,610 | 2/1971 | Viollet................................. | 114/125 |
| 3,665,168 | 5/1972 | Canfield.......................... | 114/122 X |

*Primary Examiner*—Joseph F. Ruggiero
*Attorney, Agent, or Firm*—Young & Thompson

[57] ABSTRACT

A computing device that measures the time between consecutive signals coming from a rolling time gauge that gives a signal every time the ship starts rolling from one direction. The time measured is the time of one single complete period of rolling. Every period of rolling is thereby measured individually. These measurements are collected in an electronic memory. Every single rolling time is different from the other and they are statistically spread over an interval. The spreading depends, among other things, on influence of the sea and the yaws. When a certain number of rolling times are stored in the memory, the computing device carries out a maximum calculation. This means that the computing device calculates and presents the rolling time that is most common. This is the period of resonance of the ship as a swinging system, and it is defined as the rolling time of the ship under actual conditions. The gauge and the computing device are working continually, thereby showing changes of the stability condition depending, for example, on an icy superstructure and changed conditions in the bunker. When the rolling time is known and the draught of the ship has been determined, the stability condition can be read on a certain diagram, thus enabling the officer at watch always to be in possession of accurate information of the seaworthiness of his ship. Since a recording equipment can be connected to the above-described device, the stability condition can be documented during the whole trip which can be important, e.g. when carrying fruit and other fragile cargo.

5 Claims, 3 Drawing Figures

DEVICE FOR CALCULATING THE RESONANT ROLLING PERIOD OF A SHIP

The present invention relates to a device for calculating the rolling period of a ship.

The rolling period of a ship depends unambiguously on its stability condition. However, this rolling period or rolling frequency is statistically spread over a certain relatively broad interval of time depending on influence of among other things wind, waves and yaws. Methods earlier used to determine the stability of ships are based on estimating the weight and distribution of the cargo in a ship in one or another way, e.g. by estimating the location of the centre of gravity, and these values thereafter have to be introduced manually into a calculating device. Hereby uncertainty arises especially concerning the centre of gravity of the cargo. Ice growing on the super-structure and water penetrating into timber cargo carried on deck are almost impossible to estimate although these phenomena greatly influence the stability.

In the present invention these disadvantages are avoided by the continuous measuring and calculating of the rolling period.

A gauge sends a pulse to a computing device every time the ship starts a new period of rolling from the maximum angle of rolling towards one side e.g. starboard. This device measures the time between two generated signals, at the maximum angle of rolling, coming from the gauge, which time represents a complete period of rolling. In this manner every rolling period becomes individually measured as to time. These times measured are collected in an electronic memory. When a certain amount of rolling times have been registered in the memory, the computing device carries out a calculation of the maximum point of the content of the memory which means that the device calculates and presents the most common period of rolling. This is the period of resonance of the ship as a swinging system and is defined as the period of resonance of the ship at this certain time. When the rolling period has been presented by the computing device and the draft of the ship has been determined the stability condition can be read by the help of a diagram. By means of this diagram the stability of the ship can be so adapted that it neither becomes such that fragile cargo can be damaged nor such that the ship is unseaworthy. These conditions can be documented, e.g. by a register.

According to the invention, the above mentioned advantages are attained in that a gauge releases an electric pulse every time the ship starts a rolling period from the maximum angle of rolling towards either starboard or port, and the very first such pulse starts a time controlled switch that distributes following pulses to storage locations within a statistical memory where every location has its determined time-position within a time interval. The location which the switch is connected at that very moment registers a pulse, and when the memory has stored a predetermined amount of information, thereafter incoming pulses each starts a scanning cycle by a scanner over the memory with simultaneous integrating of the content of the memory by means of an integrator whereby a derivator derivates the out-signal from the integrator. The out-signal from the derivator is distributed to a sensor which also receives information concerning the scanning position in the memory of the scanner, senses the maximum point of the derived signal which corresponds to a certain storage location and transmits this information of the scanning position to an indicator at the moment that the maximum point mentioned is present whereby the time position of this specific storage location represents the rolling period of the ship. A subtractor subtracts a predetermined and for all locations equal amount of information from the content in every location when a storage location is filled.

Figure 1:
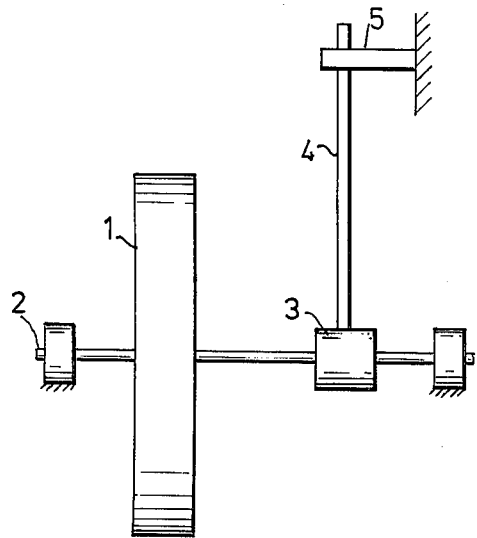
Figure 2:
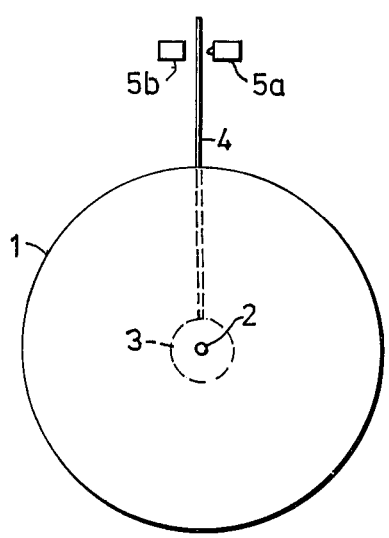

The invention is described in greater detail in connection with the accompanying drawing where FIG. 1 schematically shows a side view of above mentioned gauge, FIG. 2 shows a front view of the gauge according to FIG. 1 and FIG. 3 shows a simplified block diagram of the computing device according to the invention.

According to FIG. 1 a statically well balanced flywheel 1 is fixed to a shaft 2 which is oriented in the longitudinal direction of the ship and is supported by low-friction bearings. On the shaft 2 a contact lever 4 is mounted by means of a bearing 3 which has higher friction than the other bearings mentioned and so that the lever will rotate with the shaft when the flywheel rotates until the free end of the lever hits a stop device 5. The device 5 is illustrated in FIG. 2 and consists of two fixed stop notches 5a, 5b of which one 5a together with the lever 4 constitutes an electric switch. The stop notches' 5a, 5b relative distance is equal to a turning of a few degrees of the wheel 1. In fact the wheel 1 is of course not turning while the rest of the gauge follows the rolling of the ship. As a result of in this case using the flywheel 1, the influence of movements other than pure rolling is avoided. These other movements can e.g. be horizontal parallel translations of the ship and which would have influenced a pendulum-gauge. The switch 4, 5a is part of an electric circuit belonging to the computing device according to FIG. 3 and breaks this circuit every time the lever 4 is released from touching the part 5a as a result of the turning of the flywheel 1 relative to the ship. Upon disconnecting, the gauge generates a pulse to the computing device that measures the time between two consecutive pulses.

FIG. 3 shows only an example of a combination of functional blocks to use the invention but of course there are several other combinations with similar function. The block diagram is built up around a statistical memory 21 consisting of storage locations 1,2...n in which memory information is stored e.g. in binary form and which information is delivered from the gauge according to FIGS. 1 and 2 by an electronic time controlled selector switch 22. By the use of a scanner 23 that is connected to the memory the storage of information in every location is scanned in the order 1—n as regards the level of information. The information scanned as described and depending on the level of information in the piles is integrated in an integrator 24 whereafter its output signal is derivated in a differentiating circuit comprising a derivator 25. A sensor 26 is connected both to the output of the derivator 25 and to one of the outputs of the scanner 23 so that the scanning position in the memory 21 of the scanner 23 is sensed together with the output signal from the derivator 25. When this out-signal reaches its maximum value the sensor releases information to an indicator 27 that shows the scanning position in the memory 21. The indication can e.g. be brought about by means of light emitting diodes or digital read out tube. When a pulse is introduced from the gauge to the time controlled switch 22 this switch starts stepping forward successively to the respective entrances of the storage locations 1—$n$. Every location covers a time-interval e.g. 0.5 seconds. The stepping forward is guided by a clock-function so that every location will represent a certain time-position which means that it has the time-position $n \cdot 0.5$ seconds. When the next pulse arrives it is stored in that particular location to which the switch 22 at the moment is in connection. At the same moment the switch returns to its starting position and again starts a new stepping forward as mentioned above to the different storage locations. The function to measure the time between two consecutive pulses which is one of the functions in the computing device is hereby fulfilled by the time controlled stepping forward by the switch 22. When a predetermined amount of information is stored in the memory 21 it is scanned and integrated every time a pulse arrives from the gauge.

When one of the piles is filled it releases a signal to a subtractor 28 which now subtracts a predetermined amount of information, equal for all locations, from every location. If some location contains less information than what is subtracted the location is emptied and put on zero which means that the stored amount of information never can become negative. As a result of this subtraction unnecessary storing of "bottom" information is avoided so that a change in the statistical material is indicated.

What I claim is:

1. A device for ascertaining the most prevalent rolling period of a ship, including a pulse generator responsive to rolling to generate a train of pulses, each of which has a predetermined time relationship with the rolling motion in which it occurs, the interval between successive pulses representing the rolling period, a statistical memory having different storage locations corresponding respectively to different values of rolling period, a timer responsive to each new pulse from the pulse generator to start a new timing cycle and to enter a signal into the storage location corresponding to the duration of the period terminated by that pulse, an output scanner for scanning the storage locations to derive signals representing the number of entries in the different storage locations, and a maximum signal sensor responsive to the signals from the output scanner for ascertaining the storage location in which the most signals have been entered.

2. A device in accordance with claim 1, in which the maximum signal sensor includes an integrator for generating a waveform representing the sum of the successive outputs of the scanned storage locations, each output corresponding to the number of signals entered in that storage location, a differentiating circuit for deriving a signal representing the time derivative of the integrator output, means responsive to the output of the differentiating circuit to sense a value thereof corresponding to the portion of the integrator output in which the maximum rate of increase occurs, and means for applying a signal representing the storage location corresponding to the said portion of the integrator output to an indicating apparatus.

3. A device in accordance with claim 1, including means responsive to the number of entries in a storage location reaching a predetermined maximum for subtracting an equal number of entries from each of the storage locations.

4. A device in accordance with claim 1, in which the timer is an electronic stepping switch which steps at predetermined intervals through a number of switch conditions, following initiation of the operation of the timer, the switch having a number of output conductors corresponding to respective switch conditions and connected to respective ones of the storage locations, the switch being so arranged that in response to a signal from the pulse generator a pulse representing the existing switch condition is applied over the corresponding output conductor to the corresponding storage location and the switch is reset.

5. A device in accordance with claim 1, in which the pulse generator comprises a flywheel fixed to a shaft, an elongated member mounted at one of its ends on the shaft through a bearing which has substantial friction, the other of its ends being free, and two stop members mounted on opposite sides of the free end of the elongated member so as to be contacted by the elongated member in response to relative rotation between the flywheel and the stop members, one of the stop members including means for transmitting an electric signal in response to contact with the elongated member, whereby when the device is mounted on a ship with the shaft extending in the longitudinal direction of the ship, electric signals are generated in response to rolling motion of the ship.

* * * * *